(12) United States Patent
Kiritz (10) Patent No.: US 11,863,010 B2
(45) Date of Patent: Jan. 2, 2024

(54) POWER CONTINUITY APPARATUS

(71) Applicant: Alexander Kiritz, Redondo Beach, CA (US)

(72) Inventor: Alexander Kiritz, Redondo Beach, CA (US)

(*) Notice: Subject to any disclaimer, the term of this patent is extended or adjusted under 35 U.S.C. 154(b) by 467 days.

(21) Appl. No.: 16/745,054

(22) Filed: Jan. 16, 2020

(65) Prior Publication Data

US 2020/0227936 A1 Jul. 16, 2020

Related U.S. Application Data

(60) Provisional application No. 62/793,330, filed on Jan. 16, 2019.

(51) Int. Cl.
*H02J 7/35* (2006.01)
*H01M 10/48* (2006.01)
(Continued)

(52) U.S. Cl.
CPC .............. *H02J 7/35* (2013.01); *F03D 9/35* (2016.05); *H01M 4/485* (2013.01);
(Continued)

(58) Field of Classification Search
CPC .. H02J 3/381; H02J 7/35; H02J 7/0014; H02J 7/0047; H02J 2207/20; H02J 2300/26;
(Continued)

(56) References Cited

U.S. PATENT DOCUMENTS 5,599,636 A * 2/1997 Braun ................. H01M 10/615
429/81
6,021,040 A 2/2000 Suzuki et al.
(Continued)

FOREIGN PATENT DOCUMENTS

DE 102005025616 A1 * 12/2006 ............. B60L 58/30
EP 3046159 12/2018
(Continued)

OTHER PUBLICATIONS

Author: Bote Zhao, et al., Title: "A comprehensive review of Li4Ti5O12-based electrodes for lithium-ion batteries: The latest advancements and future perspectives", Date: Dec. 2015, Materials Science and Engineering: R: Reports, vol. 98, p. 1-71 (Year: 2015).*
(Continued)

*Primary Examiner* — Matthew T Martin
*Assistant Examiner* — Jared Hansen
(74) *Attorney, Agent, or Firm* — Concourse Law Group; Katherine B. Sales, Esq.

(57) ABSTRACT

A power continuity unit includes a battery pack, a power converter, and a housing assembly. The battery pack includes a plurality of battery cells with monitoring devices that monitor the voltage of the associated battery cell and trim excess voltage. During daytime, the power converter converts a portion of the direct current (DC) power it receives from an alternative energy device into alternating current (AC) power and directs it to a user, while the remainder is stored in the battery pack. During nighttime, the power converter converts DC power it receives from the battery pack into alternating current (AC) power and directs it to the user. The housing assembly provides structural support and protection to the battery pack; its configuration depends on the type of battery cell being used.

18 Claims, 6 Drawing Sheets

(51) Int. Cl.
  *H01M 4/485* (2010.01)
  *H01M 10/613* (2014.01)
  *H02J 7/00* (2006.01)
  *H02J 3/38* (2006.01)
  *H01M 10/42* (2006.01)
  *F03D 9/35* (2016.01)

(52) U.S. Cl.
  CPC ..... *H01M 10/4257* (2013.01); *H01M 10/482* (2013.01); *H01M 10/486* (2013.01); *H01M 10/613* (2015.04); *H02J 3/381* (2013.01); *H02J 7/0014* (2013.01); *H02J 7/0047* (2013.01); *H01M 2010/4271* (2013.01); *H01M 2220/10* (2013.01); *H02J 2207/20* (2020.01); *H02J 2300/26* (2020.01); *H02J 2300/28* (2020.01)

(58) Field of Classification Search
  CPC .. H01M 4/485; H01M 10/425; H01M 10/441; H01M 10/482; H01M 10/486; H01M 10/613; H01M 10/615; H01M 10/627; H01M 10/633; H01M 10/653; H01M 10/4257; H01M 10/6556; H01M 10/6566; H01M 50/22; H01M 50/224; H01M 50/251; H01M 2010/4271; H01M 2220/10; Y02E 10/10; Y02E 10/30; Y02E 10/56; Y02E 10/72; Y02E 10/76; Y02E 10/728
  See application file for complete search history.

(56) References Cited

U.S. PATENT DOCUMENTS

| | | | |
|---|---|---|---|
| 8,882,441 B2 | 11/2014 | Harrison et al. | |
| 10,992,139 B1* | 4/2021 | Dibachi | H02J 7/35 |
| 2004/0104708 A1* | 6/2004 | Zhang | H02J 7/0029 |
| | | | 320/136 |
| 2004/0194489 A1 | 10/2004 | Pode | |
| 2007/0257642 A1 | 11/2007 | Xiao et al. | |
| 2007/0290674 A1* | 12/2007 | Bolz | G01R 31/396 |
| | | | 324/119 |
| 2010/0276132 A1 | 11/2010 | Payne | |
| 2011/0069451 A1* | 3/2011 | Hobein | H02M 7/003 |
| | | | 361/695 |
| 2011/0215640 A1 | 9/2011 | Donnelly et al. | |
| 2013/0071705 A1* | 3/2013 | Frutschy | H01M 10/6554 |
| | | | 429/62 |
| 2013/0312947 A1 | 11/2013 | Bandhauer et al. | |
| 2014/0002003 A1* | 1/2014 | Kim | H01M 50/502 |
| | | | 429/61 |
| 2016/0049706 A1 | 2/2016 | Kerspe et al. | |
| 2016/0064999 A1 | 3/2016 | Takano | |
| 2016/0141894 A1* | 5/2016 | Beaston | H02J 7/0014 |
| | | | 320/103 |
| 2016/0156220 A1* | 6/2016 | Kaag | H02S 40/38 |
| | | | 307/20 |
| 2017/0033408 A1* | 2/2017 | O'Hora | H01M 10/486 |
| 2018/0123348 A1* | 5/2018 | Narla | H02J 3/381 |
| 2018/0212222 A1* | 7/2018 | Barton | H01M 50/3425 |
| 2018/0219511 A1* | 8/2018 | Ghirardelli | H02S 40/32 |
| 2019/0237826 A1* | 8/2019 | Ida | H02J 7/00 |

FOREIGN PATENT DOCUMENTS

| | | |
|---|---|---|
| JP | H11-260399 | 9/1999 |
| WO | WO 2011/077109 | 6/2011 |

OTHER PUBLICATIONS

Solarponics Energy Management Systems, "Net Zero: What Does It Mean And How Is It Achieved?", May 31, 2015 (Year: 2015).*
Loniza, Erika, et al. "Passive balancing of battery lithium polymer using shunt resistor circuit method." AIP Conference Proceedings. vol. 1755. No. 1. AIP Publishing LLC, 2016 (Year: 2016).*
De102005025616A1, Froeschl, et al., "Energy store's fuel cell voltage monitoring/controlling method for motor vehicle on-board supply system" machine English translation retrieved from https://worldwide.espacenet.com/ Date: Feb. 15, 2023 (Year: 2006).*
PCT/US2020/013932, International Search Report dated Apr. 1, 2020. 16 pages.
European Search Report for corresponding EU application No. 20741112.5, published Nov. 24, 2021 as Publication No. EP3912220 (Search Report dated Oct. 18, 2022).

* cited by examiner

POWER CONTINUITY APPARATUS

TECHNICAL FIELD

This disclosure relates to energy storage devices. More specifically, the disclosed embodiments relate to systems, methods, and apparatus for storing and subsequently releasing energy collected or generated by renewable energy devices or systems such as photovoltaic panels and wind turbines.

BACKGROUND

Renewable energy may become increasingly important as the world moves away from energy created from fossil fuels. Several challenges currently limit how much energy can be created by alternative energy devices such as solar panels and wind turbines. One challenge is integrating such devices into the existing electrical grid. Another inherent challenge is that renewable energy devices operate intermittently. For instance, solar panels only generate energy or power during the day when the sun is out, and the output of wind turbines is highly variable dependent on the amount of wind at any given time. This is not acceptable to industries and individual consumers who require consistent access to power 24 hours a day.

Many consumers choose not to have solar panels installed because they feel that if they generate their own power, they should be able to have power even when the electrical grid is down. Therefore, a new and superior solution to the intermittency problem should increase the demand for renewable solar power.

Storing electrical energy created by solar panels generally requires the use of batteries. One solution for consumer energy storage is the Powerwall™ device developed by Tesla, Inc®. However, the batteries in this device may only last a decade, whereas many solar panels generally are designed to last at least 25 years. Another solution for off-grid storage includes lead-acid batteries, such as those found in cars. However, these batteries are bulky, include dangerous chemicals, and have a short life span compared to the life span of a solar panel. Either of these solutions would require replacement of the electrical energy storage unit associated with a solar panel at least once during the lifetime of the solar panel, which is costly and inefficient. Additionally, systems which integrate separate solar generation and battery storage units inevitably result in extra redundant parts being used which still do not provide extra redundancy to the system or extra value. One of the most cost-efficient solutions is to store energy in batteries with a long cycle life, such as those with the lithium titanite chemistry. However, batteries such as these can degrade when subjected to the large temperature fluctuations often found with outdoor, especially rooftop, solar panel installations in areas which have the highest levels of solar insolation. Similar problems exist with batteries designed for use with wind turbines.

Accordingly, there is a need for more intelligent and efficient solutions to the problem of storing energy collected or generated by renewable sources.

SUMMARY OF THE DISCLOSURE

A power continuity unit according to the present disclosure includes a battery pack, a power converter, and a housing assembly. The battery pack includes a plurality of battery cells with monitoring devices, each monitoring device being configured to monitor the voltage of the associated battery cell and to trim excess voltage over an optimal voltage for the associated battery cell. The power converter receives direct current (DC) power from the alternative energy device and monitoring data from the monitoring device, and is programmed to a) convert a portion of the DC power received from the alternative energy device into alternating current (AC) power for output to a user during daytime use, (b) direct a portion of the DC power received from the alternative energy device to the battery pack for storage as stored electrical energy, and (c) convert stored electrical energy from the battery pack into AC power for output to the user during nighttime use. The function of the housing assembly is to provide structural support and protection to the battery pack; its configuration depends in part on the type of battery cell being used.

In several embodiments, the alternative energy device is a solar panel and the housing assembly is external to the solar panel. In such embodiments, the battery cells may be lithium titanate oxide (LTO) cells and the housing assembly may comprise a single heat-dissipating casing surrounding both the battery pack and the power converter. In other embodiments, the battery cells may be non-LTO battery cells, and the housing may include features for protecting the battery cells from extreme temperatures. For instance, the housing assembly may comprise a battery casing made from heat-insulating material and a converter casing made from heat-dissipating material.

In some embodiments, the housing assembly is sized to fit in a space beneath a solar panel without obstructing solar radiation incident on the solar panel, and the battery casing is sized to receive twenty or more rechargeable batteries.

In some embodiments, the power continuity unit includes a fluid circulator such as a fan or a pump housed by the housing assembly and configured to drive fluid to the plurality of battery cells in the battery pack.

In some embodiments, the monitoring device associated with each battery cell is configured to monitor the temperature of the associated battery and the power converter is configured to operate a fluid circular in response to temperature data sent by the monitoring devices.

In some embodiments, the battery pack(s) are encased in single vacuum thermos(es), and the power converter may be encased in a separate housing fabricated from heat-dissipating material.

In other embodiments, the housing assembly comprises a plurality of vacuum thermoses, wherein each battery cell of the battery pack is contained within its own thermos. Each vacuum thermos comprises an inner portion configured to receive a battery in a thermos interior, an outer portion configured to at least partially enclose the inner portion and thereby define a vacuum space between the inner portion and the outer portion, and a passage from the outer portion to the thermos interior, the passage configured to receive electrical connections to the enclosed battery and permit air to flow from a space exterior to the outer portion to the thermos interior. These embodiments may also include a cooling manifold configured to carry a flow of air to the thermos interior of each of the plurality of thermoses. In addition, the outer portion of each of the thermoses may include a port through which air can be removed from the vacuum space between the inner portion and the outer portion.

In some embodiments, the alternative energy device is a wind turbine system including a tower defining an interior bounded by a tower wall; and the housing assembly comprises the tower wall. The tower wall may include an upper portion encasing the converter and a lower portion encasing the battery pack, wherein the upper portion of the wall is fabricated from a heat-dissipating material selected to allow heat generated by components of the converter to dissipate rapidly; and the lower portion of the wall is fabricated from an insulating material selected to minimize heat transfer to the battery pack from external sources.

In some embodiments, the power continuity unit comprises a cut-on switch configured to allow a user to selectively connect the power continuity unit to an external power grid.

In some embodiments, the power continuity unit comprises electrical connections configured to connect a first subgroup of battery cells together in series, a second subgroup of battery cells together in series, and to connect the first subgroup in parallel with the second subgroup.

In some embodiments, the power converter is further configured to receive voltage data from a plurality of monitoring devices, wherein each monitoring device is associated with one battery within the battery pack, and to alter the portion of DC power directed to each battery based on the received voltage data from the associated battery pack.

DETAILED DESCRIPTION

Various embodiments of a photovoltaic power continuity device having a battery pack are described below and illustrated in the associated drawings. Unless otherwise specified, the photovoltaic power continuity device and/or its various components may, but are not required to, contain at least one of the structures, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar apparatuses. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Figure 1:
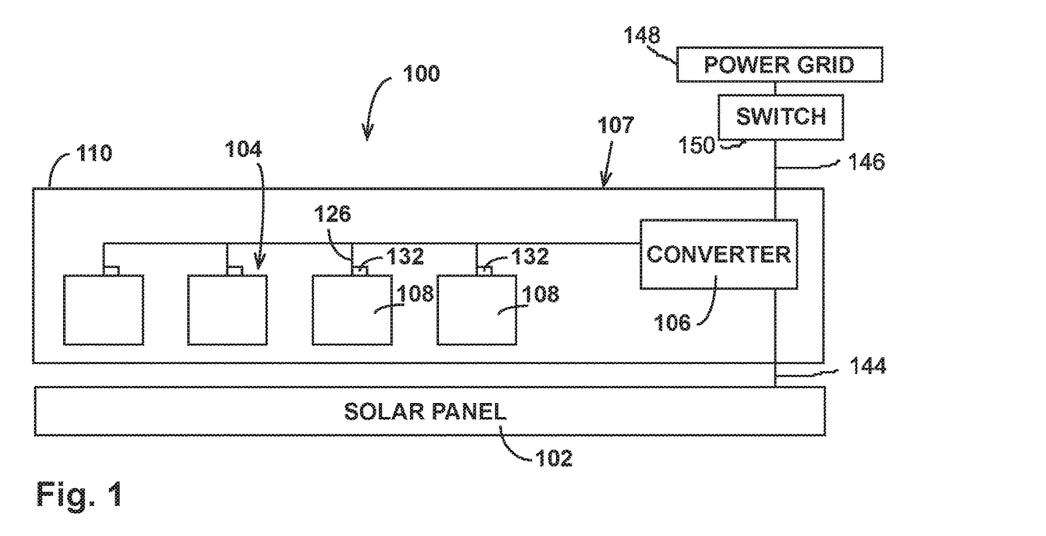
FIG. 1 is a schematic diagram of a power continuity unit associated with a solar panel, including a battery pack and a power converter, according to aspects of the present disclosure.

FIG. 1 is a schematic diagram of a power continuity unit, generally indicated at 100, associated with a solar panel 102. Power continuity unit 100 includes a battery pack 104, a power converter 106, and a housing assembly 107.

In the embodiment of FIG. 1, the battery pack 104 includes a rechargeable plurality of lithium-titanite or lithium-titanite oxide (LTO) battery cells 108. LTO battery cells have a relatively long life-cycle and can charge and discharge over a significantly higher temperature range than other commercially available rechargeable battery cells. These cells may be highly efficient for storing and recovering energy, potentially with less than 1% of the stored energy lost as heat. In this embodiment, the battery cells 108 may be prismatic and may be positioned side-to-side, which giving the battery pack 104 the ability to fit into a flat, compact housing assembly 107. One example of a suitable cell for use in this embodiment is the SCiB™ rechargeable cell manufactured by the Toshiba Corporation of Tokyo, Japan.

The battery cells may be electrically connected to one another through any appropriate combination of series and parallel electrical connections. In some examples, ten battery cells may be electrically connected to one another in series within a battery pack 104. In some examples, battery pack 104 may include two subgroups of battery cells connected in series with one another, with the two subgroups connected in parallel with one another. For example, ten series-connected battery cell cells may be connected in parallel with another ten series-connected battery cell cells. In some examples, more than two subgroups of battery cell cells may be connected with one another in parallel, with the battery cells within each subgroup connected in series.

In this embodiment, the housing assembly 107 may comprises a single casing 110 enclosing both the battery pack 104 and the power conversion unit 106. The casing 110 may be rectangular and relatively flat in configuration to best accommodate the flat, rectangular shape of prismatic battery cells 108, and may be made of aluminum or other material capable of dissipating heat generated by components within power converter device 106. The ability of LTO battery cells to withstand extreme temperatures eliminates the need for insulation in this embodiment.

Battery case 110 may further include a plurality of monitoring devices 132. Each monitoring device 132 of the plurality of monitoring devices may be configured to be associated with one of the plurality of battery cells 108. Each monitoring device may be configured to monitor the temperature and/or voltage of the associated battery cell. Each monitoring device may be configured to be connected to the associated battery cell through electrical connections 126. Each monitoring device may be configured to trim excess voltage over an optimal voltage for the associated battery cell. The plurality of monitoring devices may be part of a feedback loop or feedback system configured to help operate power continuity unit 100 as efficiently as is possible. Power converter 106 may be configured to be electrically connected, shown schematically at 841, to the plurality of battery cells 108. That is, power converter 106 may be configured to be electrically connected to the electrical connections 126 within the battery pack. The power converter 106 may be configured to be electrically connected, shown schematically at 144, to the associated alternative energy device 102. The power converter 106 may be configured to be electrically connected, shown schematically at 146, to a power grid 148.

Power converter 106 may be, at least partially, a computing device and may include a processor, a memory, and a program including a set of instructions stored in the memory and executable by the processor to perform a variety of functions relating to converting, storing, and releasing electrical energy via power continuity unit 100.

Power converter 106 may be configured to be connected to, or in communication with, one or more computing devices across a network, such as the plurality of monitoring devices 132 within the battery pack, a power converter device from another power continuity unit, a central server configured to monitor one or more power continuity units, or some other computing device.

Figure 8:
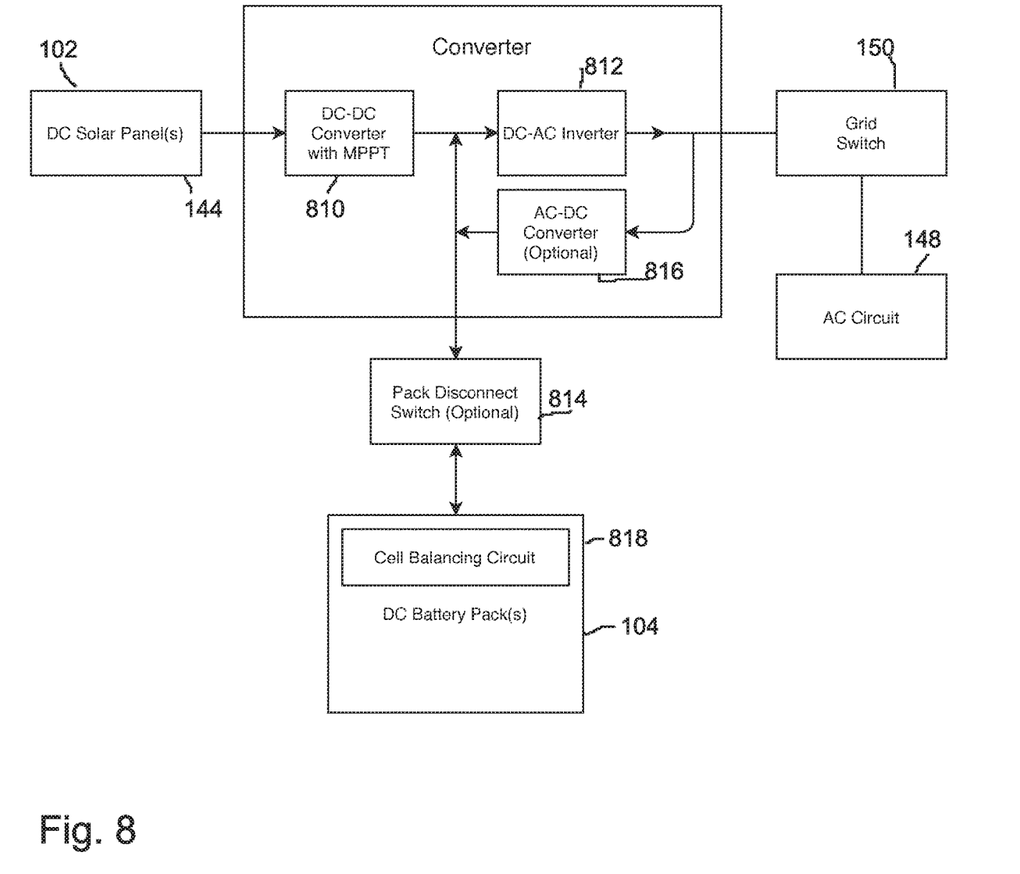
FIG. 8 is a schematic diagram showing the flow of power between an AC circuit, a power converter unit according to the present disclosure, and one or more solar panels.

As shown schematically in FIG. 8, power converter 106 includes a DC-to-DC converter 810 that is configured to receive DC output from solar panel(s) 102 through electrical connections 144 and to convert this relatively high voltage output to the lower voltage needed to charge the cells in battery pack 104. The DC-to-DC converter 810 uses maximum power point tracking (MPPT) to optimize the efficiency of power transfer from the solar panel. Output from the DC-to-DC converter 810 is then directed to AC circuit (power grid) 148, battery pack(s) 104, or both, as needed. Grid switch 150 controls the flow of power between the DC-to-AC inverter 812 and the AC circuit 148, and an optional pack disconnect switch 814 can be added to control the flow of power between the DC-to-DC converter 810 and the battery pack(s) 104. In addition, the power converter 106 may optionally include an AC-to-DC converter 816 that allows the battery pack 104 to be charged with incoming power from the AC circuit 148.

Ideally, battery pack 104 includes a cell balancing circuit 818 which optimizes the distribution of power between the cells to improve the available capacity of the battery pack 104 and increase the longevity of each individual cell.

Power converter 106 may be configured to receive monitoring data from the plurality of monitoring devices 132 in battery pack 104. The power converter 106 may alter the power directed to plurality of battery cells 108 in the battery pack based on the received monitoring data. The power conversion unit may alter the amount of stored electrical energy which is converted into AC power based on the received monitoring data.

In some examples, power converter 106 may be configured to receive voltage data from the plurality of monitoring devices 132 associated with the plurality of battery cells 108 within battery pack 104. The power conversion unit may be configured to alter the portion of DC power directed to one battery cell of the plurality of battery cells within the battery pack base on the received voltage data from the monitoring device associated with the one battery cell of the plurality of battery cells. This may ensure that each of the battery cells is always at the same optimal voltage, which may help the battery pack achieve a maximum possible lifetime.

Switch 150 may alternately couple and decouple power continuity unit 100 from power grid 148. In some examples, switch 150 may be an automatic switch that either opens or closes in response to a stimulus external to the power continuity unit or to a stimulus internal to the power continuity unit. In some examples, switch 150 may be operated selectively by a user such as an owner or operator of power continuity unit 100. In some examples, switch 150 may be a cut-on switch configured to allow a user to selectively connect power continuity unit 100 to an external power grid such as power grid 148.

All or part of power continuity unit 100 may be sized and/or configured to fit beneath most commercially available solar panels. In some examples, the power continuity unit 100 may be configured to be attached to a racking system for the solar panel. In some examples, the housing assembly 107 may be sized to fit in a space beneath a solar panel without obstructing solar radiation incident on the solar panel.

In some examples, power continuity unit 100 may be integrated with an associated solar panel 102 and may be configured for connection to a solar panel array. That is, the power continuity unit may be a separate product which can be used with a commercially available solar panel, or the solar panel and power continuity unit may be integrated into a single product. In some cases, the solar panel and power continuity unit may be integrated into a single device, such as a roofing tile, and may include connection points for electrically connecting the device into a solar panel array.

Installation costs of a solar panel array, including one or more power continuity units as disclosed herein, may be reduced through automation of the installation process. In some examples, a drone could be used to scan the three-dimensional structure of a roof and a computing device could use the results of that scan to determine an optimal configuration for a solar panel array installed on that roof. One or more drones could then install a racking system on the roof, install one or more power continuity units, and/or install one or more solar panels. Using such a system, an entire solar panel array could be installed quickly and safely by a single operator.

Figure 2:
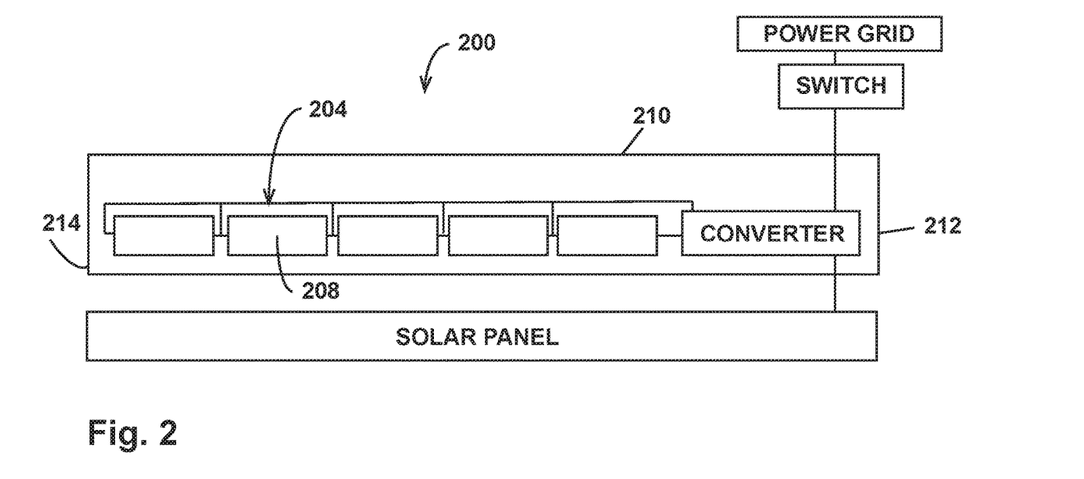
FIG. 2 is a schematic diagram showing an alternate embodiment of the disclosure.

FIG. 2 shows an alternate embodiment 200 of the invention, which, except as mentioned, is identical to the embodiment of FIG. 1, except that the LTO 208 cells in the battery pack 204 are cylindrical in configuration and are positioned end-to-end, allowing the battery pack 204 to fit into a tubular casing 210. The ends 212, 214 of the casing 210 are shown here to be closed, but they may be open if needed to provide better structural support.

Figure 3:
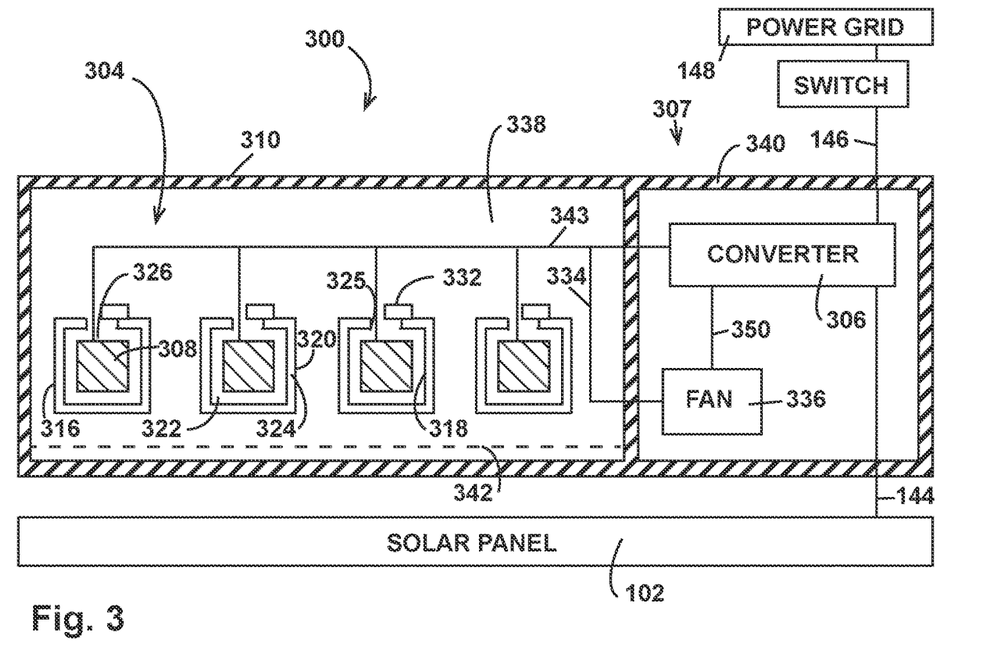
FIG. 3 is a schematic diagram showing another alternate embodiment of the disclosure.
Figure 5:
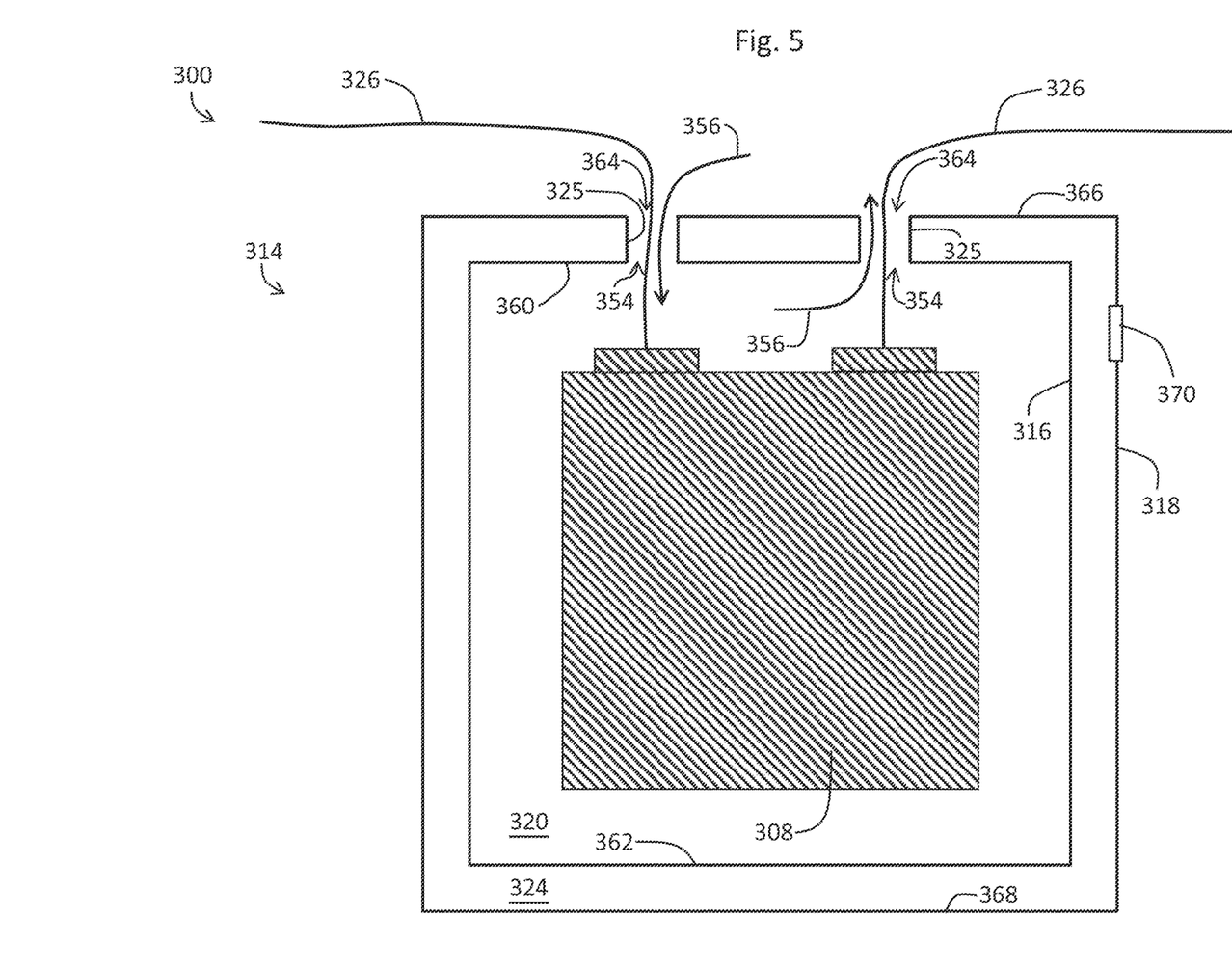
FIG. 5 is a detailed schematic diagram of a battery cell from the embodiment of FIG. 3.

The embodiments of FIGS. 3 and 5 are recommended for use with non-LTO battery cells which may have higher inherent voltage and energy density than LTO battery cells, but are not capable of withstanding extreme temperatures. The embodiments are also appropriate for LTO battery cells in environments where the ambient temperature is expected to fall below or rise above the normal temperature range for LTO battery cells.

The housing assembly 307 for the embodiment of FIG. 3 includes a battery casing 310 surrounding the battery pack 304 and a converter casing 340 surrounding the power converter 306, which functions in the same ways as the power converter 106 of FIG. 1. The battery casing 310 is preferably made from a material such as fiberglass which provides structural support as well as some degree of insulation for the battery cells. If necessary, one or more inner surfaces of the battery casing 310 may be lined with an additional layer of thermal insulating material 342 to reduce the absorption of heat from the roof top or other surface on which the power continuity unit 300 is supported. The converter casing 340, which may be snapped or otherwise secured to one end of the battery casing 310, may be made of a heat-dissipating material such as aluminum to allow rapid dissipation of heat generated by components within power converter 306.

Each battery cell 308 in the battery pack 304 is enclosed in its own individual vacuum thermos 316. Each thermos 316 is configured to provide thermal insulation for the enclosed battery 308. Alternatively stated, the thermoses 316 are configured to limit or impede the flow of thermal energy to and from the battery cells 108, via any or all of conduction, convention, or radiation.

Each thermos 316 may include an inner portion 318 and an outer portion 320. Inner portion 316 may be configured to receive battery 308 in a thermos interior 322. Outer portion 320 may be configured to at least partially enclose inner portion 318 and thereby define a vacuum space 324 between the inner portion and the outer portion. Either or both of the inner and outer portions may be formed of stainless steel or aluminum.

In some examples, the vacuum space 324 between the inner portion 318 and the outer portion 320 may be substantially depleted of air. In some examples, the vacuum space may contain an insulating material, such as a foam material, configured to inhibit the flow of air within the vacuum space.

Each thermos of the plurality of thermoses 316 may include a passage 325 from outer portion 320 to thermos interior 322. The passage 325 may be configured to receive electrical connections 326 to the enclosed battery and permit air to flow from a space exterior to outer portion 318 to the thermos interior 322. The passage 325 may also receive an electrical connector joining a temperature sensor 332 mounted on outer portion 320 to a temperature sensor within thermos interior 322. In some examples, passage 325 may include a tube extending from outer portion 320 to inner portion 318. In some examples, passage 325 may include more than one passage, for example two passages, between a space exterior to the thermos to the thermos interior. Passage 325 may be configured to provide structural separation between the inner and outer portions.

A cooling manifold 334 may be included within the battery casing. Cooling manifold 334 may include one or more pipes, passages, or other tubes which may be configured to be connected to a source of forced air and to deliver that air to the interior space of the thermoses. The cooling manifold may also include one or more pipes, passages, or other tubes to carry a flow of air away from or out of one or more of the thermos interiors.

The cooling manifold 334 may be coupled to a fluid circulator such as a pump or Tim 336 located within the converter housing 340 and configured to drive fluid flow to the plurality of battery cells 308 within battery pack 304. In some examples, fluid circulator 336 may drive the flow of fluid generally through an interior space 338 of the battery pack without using manifold 334 to direct the fluid flow directly to the thermos interiors 322. In these cases, a cooling flow of air or liquid may enter the thermos interiors through passages 324 from the interior space 338 of the batter pack.

In some examples, the fluid circulator may be a fan 336 configured to drive a flow of atmospheric air to plurality of battery cells 308 within battery pack 304, perhaps through manifold 334. In other examples, fluid circulator may be a pump configured to drive a flow of cooling liquid to the plurality of battery cells, perhaps through manifold 334. The fan or pump may be coupled to manifold 334 automatically or concurrently with coupling power converter device 306 to battery pack 304.

In some examples, power converter 306 may be configured to receive temperature data from monitoring devices 332 associated with plurality of battery cells 308 within battery pack 304. The power conversion unit may be configured to operate fan 336 in response to the received temperature data from the plurality of monitoring devices. Converter 306 may be connected to fluid circulator 316 by electrical connections 350 and may operate the fan as part of a feedback loop configured to keep the battery cells from reaching a maximum allowable temperature.

The plurality of battery cells 308 may have at least three separate thermal protections against elevated temperatures: outer casing 310, the plurality of thermoses 316, and a flow of cooling fluid provided by the fluid circulator (fan) 336.

Figure 4:
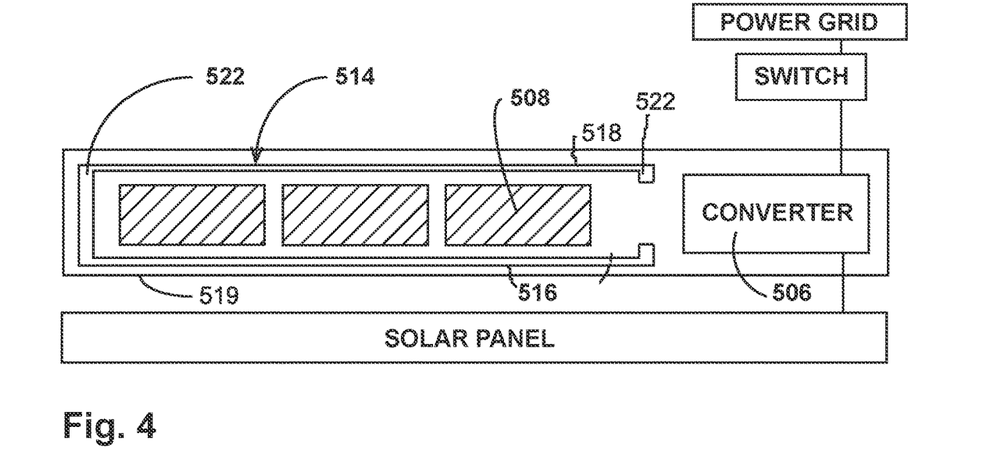
FIG. 4 is a schematic diagram showing yet another alternate embodiment of the disclosure.

FIG. 4 shows one of the battery/thermos units of FIG. 3 in greater detail. A few methods are possible for enclosing each battery 308 within a thermos 316. One method includes first enclosing the battery within the inner portion 316. Inner portion 316 may include one or more ports 354 through which electrical connections 326 may extend. Air flow, indicated by arrows 356, may also pass through ports 354. Battery 308 may be enclosed within inner portion 316 by welding a top piece 360 of the inner portion to a bottom piece 362 of the inner portion with the battery disposed between the top piece and the bottom piece. Any appropriate welding technique may be used, such as conventional welding or induction welding.

Passages 325 may subsequently be created in the inner portion 316 so that passages 325 are fluidly connected to ports 354, for example by welding tubes to the top piece 360 of the inner portion. Outer portion 318 may then be attached to the passages 325. Outer portion 318 may include one or more ports 364 fluidly connected to passages 325. Outer portion 318 may include a top piece 366 and bottom piece 368 which may be welded together thereby enclosing the inner portion 316 and defining the vacuum space 324 between the outer and inner portions.

In some examples, outer portion 318 of each of the plurality of thermoses 316 may include a port 370 through which air can be removed from vacuum space 322 between inner portion 316 and outer portion 318. That is, air may be substantially removed from the vacuum space by drawing the air through vacuum port 370 and subsequently sealing the vacuum port.

In some examples, the order of the steps for assembling the thermos may be changed. For example, the air may be evacuated from the vacuum space prior to welding together the top and bottom pieces of the inner portion and/or the outer portion.

In the embodiment of FIG. 5, cylindrical battery cells 508 are arranged end-to-end and encased in a single elongated vacuum thermos 514 which, like the thermos 314 of FIG. 4, comprises an inner portion 516 and an outer portion 518 separated by a vacuum space 522. The vacuum thermos 514 is surrounded by an external heat-dissipating housing 519 which also encloses the converter 506.

Figure 6:
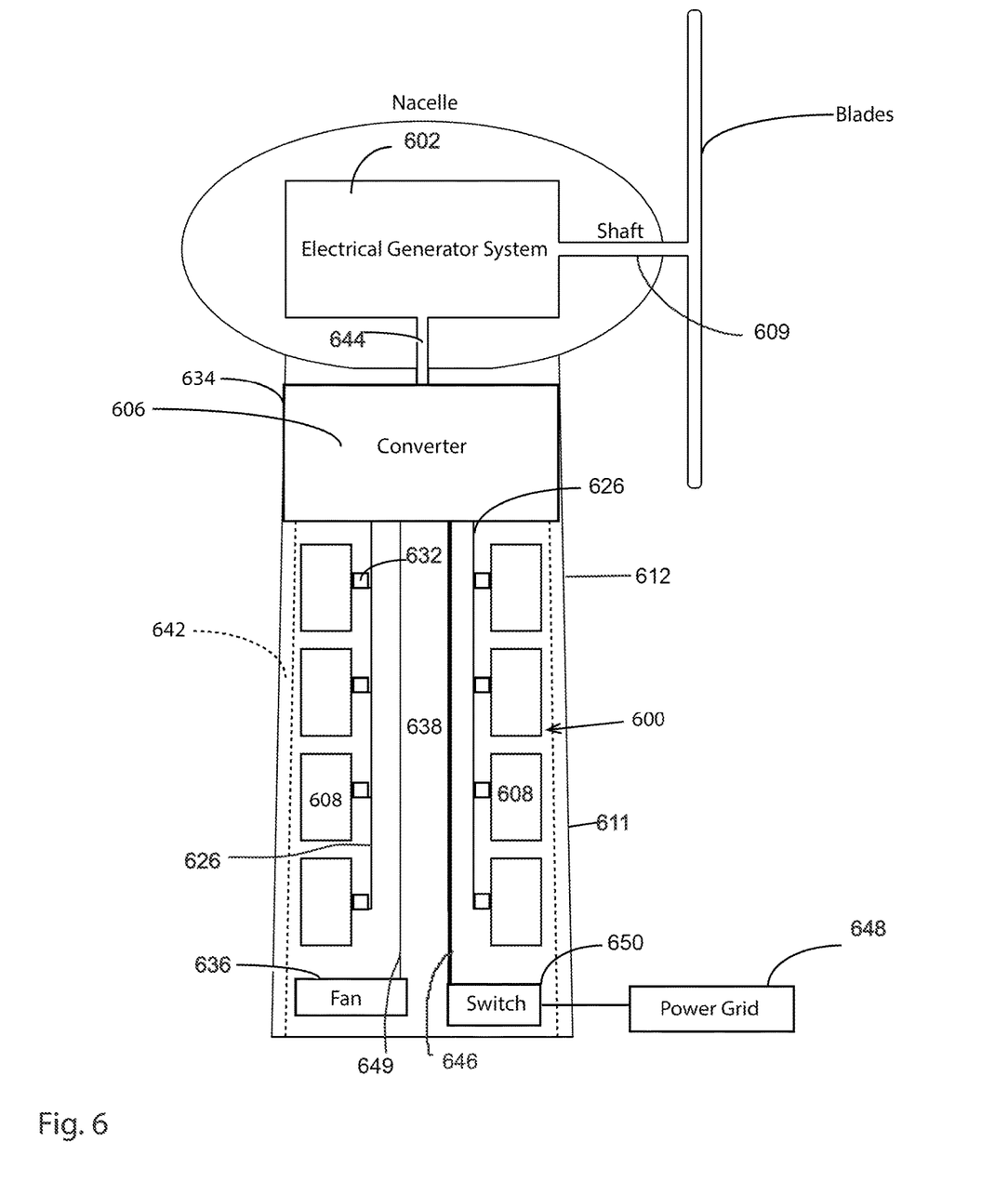
FIG. 6 is a schematic diagram of a power continuity unit associated with a wind turbine, including a battery pack and a power converter, according to another embodiment of the disclosure.

FIG. 6 is a schematic diagram of a power continuity unit according to the present disclosure, generally indicated at 600, associated with a wind turbine 601. The wind turbine tower wall 611 includes a lower portion 612 that encases a plurality of battery cells 608 and an upper portion 634 that encases a power converter 606 which function as the same manner as the power converter 106 of FIG. 1. Together, the lower portion 612 and upper portion 634 of the wind turbine tower wall 611 constitute a housing assembly.

If the battery cells 608 are LTO cells, the lower and upper portions 612, 634 of the wind turbine tower wall 611 may both be formed of a heat-dissipating material such as aluminum, and may constitute an integral unit. If non-LTO cells are used, the upper and lower portions 612, 634 may be formed of different materials and coupled to one another by any appropriate means. The lower portion 612 of the wind turbine tower wall 611 may be formed of an insulating material such as the fiberglass used in the embodiment of FIG. 3 and/or may include an additional insulating layer 642. The upper portion 634 of the wind turbine tower wall 611 may be formed of a heat dissipating material similar to the heat-dissipating material used in the housing of the power converter device of FIG. 3, and may include structural components, such as fins, to improve its heat dissipating qualities. Further, if the battery cells 308 are not LTO cells, each individual cell may be encased in its own individual thermos, as in the embodiment of FIGS. 3 and 4, or the entire tower wall 611 may be formed as a vacuum thermos encasing all the battery cells 608, similar to the embodiment of FIG. 5.

As in the previous embodiments, the battery units 608 may be electrically connected to one another through any appropriate combination of series and parallel electrical connections. In the illustrated example, five series-connected battery units 608 are connected in parallel with another series-connected battery units 608. Each of the battery units 608 may be associated with a monitoring device 632 similar to the monitoring devices of the previous embodiments.

The battery units 608 are coupled by electrical connections 626, 649 to a converter 606 that is coupled by electrical connector 644 to an electrical generator system 602 that is in rum connected by turbine shaft 609 to rotating turbine blades 611. The converter 606 may be coupled by electrical connector 646 to a power grid 648.

A fluid circulator 636 may also be housed within the interior of the wind turbine tower, and configured to drive cooling fluid to the battery units 608, either through a manifold or through the interior 638 of the wind turbine tower, without using a manifold. The fluid circulator may be coupled by electrical connection 649 to the converter 606.

As in the previous embodiments, the power continuity unit 600 may include a switch 650 for alternately coupling and decoupling the power continuity unit 600 from the power grid 648. The switch 650 may be an automatic switch that opens or closes in response to external or internal stimuli, or it may be a manual switch operated selectively by an owner or operator of the power continuity unit 600. In some examples, the switch 650 may be a cut-on switch configured to allow a user to selectively connect the power continuity unit 600 to the power grid 648.

Figures 7A, 7B, 7C:
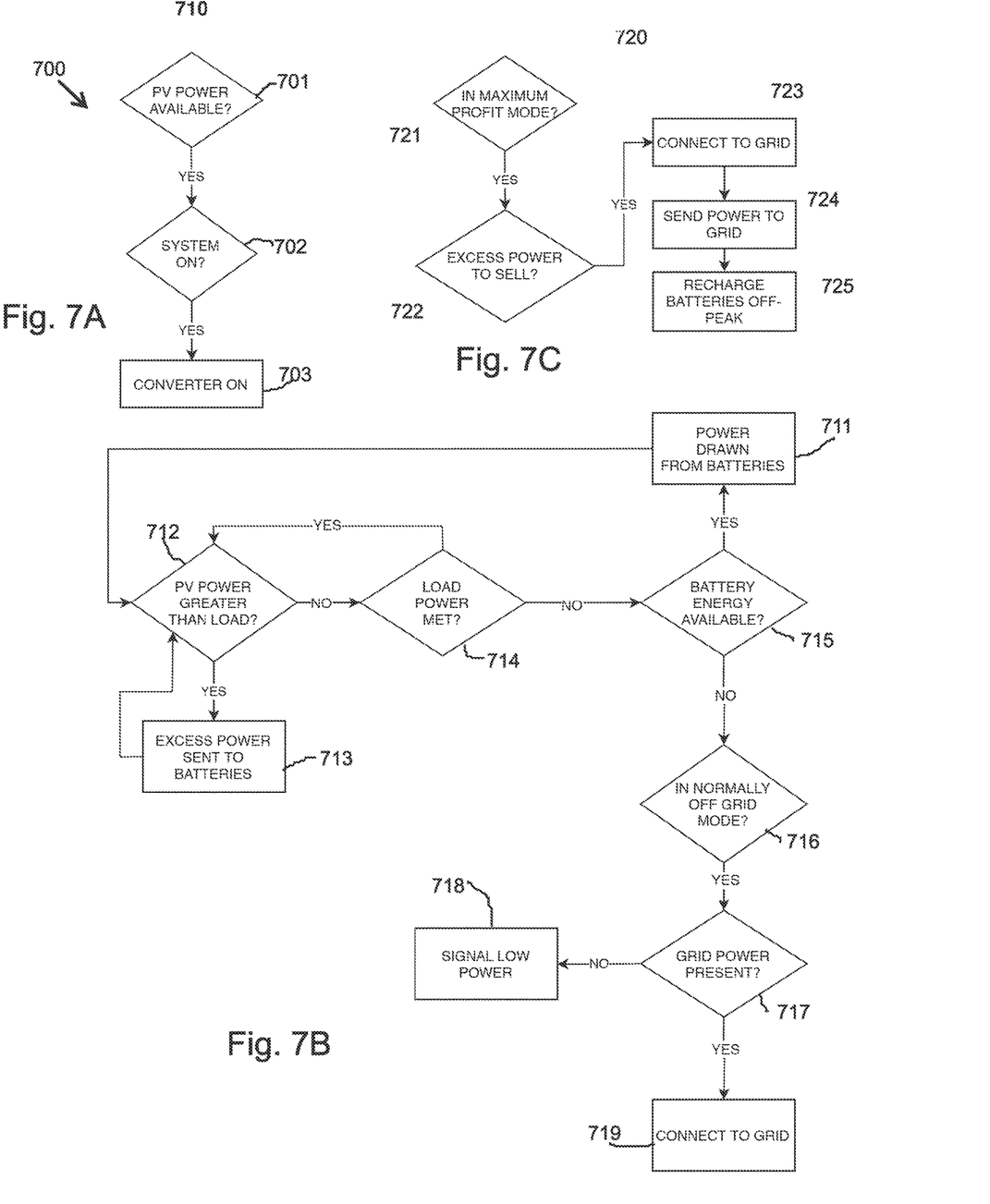
FIGS. 7A-C are flow diagrams showing operation of the control system for the power converter.

FIGS. 7A, B, and C show the programming logic behind the control system for the power converter 106 of FIG. 1. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or Hock diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the photovoltaic power continuity device. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Specifically, FIG. 7A shows a startup routine 700; FIG. 7B shows an algorithm 710 for connecting to a power grid; and FIG. 7C shows an optional subroutine 720 for users who wish to maximize their profit when selling power back to the grid.

At the beginning the startup routine 700 shown in FIG. 7A, the controller checks whether photovoltaic power is available (step 701) and if so, confirms that the system is turned on (step 702). Once this has been confirmed, the power converter 106 is turned on (step 703), and the controller moves on to the connection algorithm 710 shown in FIG. 7B.

At step 711 of the connection algorithm 710 the controller receives input from the monitoring devices on the battery cells to determine how much power is being drawn. If at step 712, the controller determines that the power drawn is greater than the load, it sends the excess power to the battery cells (step 713). If not, the controller checks whether the power is equal to the load (step 714) and if so, returns to step 712. If the power is less than the load, the controller checks whether battery energy is available (step 715). If battery energy is available, the controller cycles back to step 711. If battery energy is not available and the system is normally off grid mode (step 716), the controller checks whether grid power is present (step 717) and if so, connects to the grid (step 719) to receive more power. If grid power is not present, the system outputs a low power signal (step 718).

In the optional subroutine 720 shown in FIG. 7C, the controller checks whether the system has been set to Maximum profit mode (step 721) and if so, whether there is excess power to sell (step 722). If there is excess power, the system then connects to the grid (step 723) and sends the excess power to the grid (step 724) The battery cells are then recharged during off-peak hours (step 725).

The different embodiments of the alternative energy continuity unit described herein provide several advantages over known solutions for storing and subsequently releasing electrical energy generated by alternative energy devices. For example, the illustrative embodiments of power continuity units described herein allow for three separate controls over the temperature of a plurality of rechargeable battery cells of the power continuity units. The power continuity units also allow the use of smaller power transmission cables than are required for conventional solar or wind energy devices or systems. Additionally, and among other benefits, illustrative embodiments of the power continuity unit described herein allow for more efficient control over the electrical energy stored in the plurality of battery cells and retrieved from the battery cells. No known system or device can perform these functions, particularly as a single unit which can be configured to be used with most commercially available solar panels or installed inside a wind turbine tower. Thus, the illustrative embodiments described herein are particularly useful for use in existing alternative energy devices or systems. However, not all embodiments described herein provide the same advantages or the same degree of advantage.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A power continuity unit associated with an alternative energy device, the power continuity unit comprising:
    a battery pack including:
        a plurality of battery cells;
        a plurality of monitoring devices associated with the plurality of battery cells and configured to (a) monitor the temperature of the associated battery, (b) monitor the voltage of the associated battery, and (c) trim excess voltage over a predetermined voltage threshold for the associated battery, wherein each battery cell is associated with a separate one of the plurality of monitoring devices; and
    a power converter receiving direct current (DC) power from the alternative energy device and monitoring data from the plurality of monitoring devices, wherein the power converter is programmed to a) convert a portion of the DC power received from the alternative energy device into alternating current (AC) power for output to a user during daytime use, (b) direct a portion of the DC power received from the alternative energy device to the battery pack for storage as stored electrical energy, and (c) convert stored electrical energy from the battery pack into AC power for output to the user during nighttime use; and
    a housing assembly configured to provide structural support and protection to the battery pack and the power converter, wherein the housing assembly comprises a plurality of thermoses, with each thermos of the plurality of thermoses configured to enclose a battery cell of the plurality of battery cells and provide thermal insulation for the enclosed battery cell, each thermos of the plurality of thermoses including:
        an inner portion configured to receive a battery cell in a thermos interior;
        an outer portion configured to at least partially enclose the inner portion and thereby define a vacuum space between the inner portion and the outer portion; and
        a passage from the outer portion to the thermos interior, the passage configured to receive electrical connections to the enclosed battery cell and permit air to flow from a space exterior to the outer portion to the thermos interior.

2. The power continuity unit of claim 1, wherein the alternative energy device is a solar panel and the housing assembly is external to the solar panel.

3. The power continuity unit of claim 2, wherein the housing assembly comprises a single casing enclosing both the battery pack and the power converter.

4. The power continuity unit of claim 3, wherein the housing assembly is fabricated from a metal selected to dissipate heat from the power converter.

5. The power continuity unit of claim 4, wherein the battery pack comprises lithium titanate battery cells.

6. The power continuity unit of claim 4, wherein the battery pack comprises battery cells other than lithium titanate battery cells.

7. The power continuity unit of claim 2, wherein the housing assembly comprises:
    a battery casing surrounding the battery pack; and
    a converter casing surrounding the converter and physically coupled to an end of the battery pack;
    wherein the battery casing is fabricated from an insulating material selected to minimize heat transfer to the battery pack from external sources; and
    the converter casing is fabricated from a heat-dissipating material selected to allow heat generated by components of the converter to dissipate rapidly.

8. The power continuity unit of claim 1, further comprising a fluid circulator housed by the housing assembly and configured to drive fluid flow to the plurality of battery cells in the battery pack to ensure the battery cells continue to operate effectively.

9. The power converter device of claim 8, wherein the power converter is further configured to:
    receive temperature data from the plurality of monitoring devices; and
    operate the fluid circulator in response to the received temperature data from the plurality of monitoring devices.

10. The battery case of claim 1, further comprising:
    a cooling manifold configured to carry a flow of air to the thermos interior of each of the plurality of thermoses.

11. The power continuity unit of claim 1, wherein:
    the alternative energy device is a wind turbine system including a tower defining an interior hounded by a tower wall; and
    the housing assembly comprises the tower wall.

12. The power continuity unit of claim 11, wherein the tower wall includes an upper portion encasing the converter and a lower portion encasing the battery pack, wherein:
    the upper portion of the wall is fabricated from a heat-dissipating material selected to allow heat generated by components of the converter to dissipate rapidly; and
    the lower portion of the wall is fabricated from an insulating material selected to minimize heat transfer to the battery pack from external sources.

13. The power continuity unit of claim 1, further comprising a cut-on switch configured to allow a user to selectively connect the power continuity unit to an external power grid.

14. The power continuity unit of claim 1, wherein:
the housing assembly is sized to fit in a space beneath a solar panel without obstructing solar radiation incident on the solar panel; and
the battery casing is sized to receive up to twenty rechargeable battery cells with each of the twenty rechargeable battery cells enclosed within one of the plurality of thermoses.

15. The power continuity unit of claim 1, wherein the outer portion of each of the plurality of thermoses includes a port through which air can be removed from the vacuum space between the inner portion and the outer portion.

16. The power continuity unit of claim 1, further comprising electrical connections configured to connect a first subgroup of battery cells together in series, a second subgroup of battery cells together in series, and to connect the first subgroup in parallel with the second subgroup.

17. The power continuity unit of claim 1, wherein the power converter is further configured to:
receive voltage data from a plurality of monitoring devices, wherein each monitoring device is associated with one battery cell within the battery pack; and
alter the portion of DC power directed to each battery cell based on the received voltage data from the associated battery pack.

18. A solar panel array comprising:
a) a plurality of solar panels; and
b) a plurality of power continuity units, each power continuity unit comprising:
   i) a battery pack having a plurality of battery cells;
   ii) a plurality of monitoring devices associated with the plurality of battery cells and configured to (a) monitor the temperature of the associated battery, (b) monitor the voltage of the associated battery, and (c) trim excess voltage over an optimal voltage for the associated battery, wherein each battery cell is associated with a separate one of the plurality of monitoring devices;
   iii) a power converter receiving direct current (DC) power from the solar panel and monitoring data from the plurality of monitoring devices, wherein the power converter is programmed to a) convert a portion of the DC power received from the solar panel into alternating current (AC) power for output to a user during daytime use, (b) direct a portion of the DC power received from the solar panel to the battery pack for storage as stored electrical energy, and (c) convert stored electrical energy from the battery pack into AC power for output to the user during nighttime use; and
   iv) a housing assembly configured to provide structural support and protection to the battery pack and the power converter, wherein the housing assembly comprises a plurality of thermoses, with each thermos of the plurality of thermoses configured to enclose a battery cell of the plurality of battery cells and provide thermal insulation for the enclosed battery cell, each thermos of the plurality of thermoses including:
      an inner portion configured to receive a battery cell in a thermos interior;
      an outer portion configured to at least partially enclose the inner portion and thereby define a vacuum space between the inner portion and the outer portion; and
      a passage from the outer portion to the thermos interior, the passage configured to receive electrical connections to the enclosed battery cell and permit air to flow from a space exterior to the outer portion to the thermos interior;
wherein each solar panel is coupled to a separate power continuity unit such that each solar panel has its own battery pack for storing and releasing energy.

* * * * *